(12) United States Patent
Kraemer et al.

(10) Patent No.: US 8,910,485 B2
(45) Date of Patent: Dec. 16, 2014

(54) STOICHIOMETRIC EXHAUST GAS RECIRCULATION COMBUSTOR WITH EXTRACTION PORT FOR COOLING AIR

(75) Inventors: Gilbert Otto Kraemer, Greenville, SC (US); Sam David Draper, Greenville, SC (US); Kyle Wilson Moore, Greenville, SC (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 13/087,463

(22) Filed: Apr. 15, 2011

(65) Prior Publication Data

US 2012/0260660 A1    Oct. 18, 2012

(51) Int. Cl.
*F02C 3/34*    (2006.01)
*F23C 9/08*    (2006.01)
*F23R 3/04*    (2006.01)
*F23R 3/42*    (2006.01)

(52) U.S. Cl.
CPC ... *F02C 3/34* (2013.01); *F23R 3/04* (2013.01); *F23C 9/08* (2013.01); *F05D 2270/082* (2013.01); *F23R 3/42* (2013.01); *F23C 2900/09001* (2013.01)
USPC ............... 60/782; 60/785; 60/806; 60/39.52; 60/760; 60/752

(58) Field of Classification Search
CPC .............. F02C 6/06; F02C 3/34; F02C 3/365; F02C 1/08; F23R 3/002; F23R 3/02; F23R 3/26; F23R 3/54; F23R 3/04; F23R 3/42; Y02E 20/16; F23C 9/08; F23C 2900/09001; F05D 2270/082

USPC ................... 60/39.52, 806, 782, 785, 39.182, 60/752–760
See application file for complete search history.

(56) References Cited

U.S. PATENT DOCUMENTS

| | | | |
|---|---|---|---|
| 5,619,855 A * | 4/1997 | Burrus ........................... | 60/736 |
| 6,065,282 A * | 5/2000 | Fukue et al. ............... | 60/39.182 |
| 6,389,793 B1 * | 5/2002 | Priestley ......................... | 60/782 |
| 6,672,072 B1 * | 1/2004 | Giffin, III ....................... | 60/782 |
| 7,000,404 B2 * | 2/2006 | Palmisano et al. ............. | 60/782 |
| 7,096,674 B2 * | 8/2006 | Orlando et al. ................ | 60/782 |
| 2009/0056342 A1 * | 3/2009 | Kirzhner ........................ | 60/772 |
| 2009/0133403 A1 | 5/2009 | Som et al. | |
| 2009/0284013 A1 | 11/2009 | Anand et al. | |

\* cited by examiner

*Primary Examiner* — William H Rodriguez
*Assistant Examiner* — Carlos A Rivera
(74) *Attorney, Agent, or Firm* — Sutherland Asbill & Brennan LLP

(57) ABSTRACT

The present application provides a stoichiometric exhaust gas recovery turbine system. The stoichiometric exhaust gas recovery turbine system may include a main compressor for compressing a flow of ambient air, a turbine, and a stoichiometric exhaust gas recovery combustor. The stoichiometric exhaust gas recovery combustor may include a combustion liner, an extended flow sleeve in communication with the main compressor, and an extraction port in communication with the turbine. The extended flow sleeve receives the flow of ambient air from the main compressor so as to cool the combustion liner and then the flow of ambient air splits into an extraction flow to the turbine via the extraction port and a combustion flow within the combustion liner.

14 Claims, 1 Drawing Sheet

STOICHIOMETRIC EXHAUST GAS RECIRCULATION COMBUSTOR WITH EXTRACTION PORT FOR COOLING AIR

TECHNICAL FIELD

The present application relates generally to gas turbine engines and more particularly relates to a stoichiometric exhaust gas recirculation turbine system with a combustor having an extended flow sleeve so as to provide adequate cooling and extraction.

BACKGROUND OF THE INVENTION

In a gas turbine engine, operational efficiency generally increases as the temperature of the combustion stream increases. Higher combustion stream temperatures, however, may produce higher levels of nitrogen oxides ($NO_x$) and other types of emissions. These emissions may be subject to both federal and state regulation in the United States and also subject to similar regulations abroad. A balancing act thus exists between operating a gas turbine in an efficient temperature range while also ensuring that the output of $NO_x$ and other types of regulated emissions remain below mandated levels. Further complicating this balance, non-stoichiometric combustion may produce nitrogen oxides at the high temperatures as described above. Reducing combustion temperatures, however, may result in higher carbon monoxide (CO) emission levels because of the incomplete oxidation of the fuel. Carbon monoxide also is a regulated emission.

Recently, various types of exhaust gas recirculation (EGR) techniques, and more particularly stoichiometric exhaust gas recirculation (SEGR) techniques, have been useful in reducing overall emissions of nitrous oxides and carbon monoxide. Turbines using stoichiometric exhaust gas recirculation techniques, however, may require a significant increase in the amount of air extracted from the combustor, about thirty percent (30%) or more depending upon the flow needed to replace the oxidizer such as air or oxygen. Such a significant extraction, however, may impact at least on overall combustor cooling and combustion temperatures therein as well as the overall lifetime of the combustor components.

There is thus a desire for an improved combustor design for the use with a stoichiometric exhaust gas recirculation turbine system. Preferably such a design would permit adequate air extraction to the turbine while maintaining adequate combustor cooling and combustor temperatures for improved efficiency and overall component lifetime.

SUMMARY OF THE INVENTION

The present application provides a stoichiometric exhaust gas recovery turbine system. The stoichiometric exhaust gas recovery turbine system may include a main compressor for compressing a flow of ambient air, a turbine, and a stoichiometric exhaust gas recovery combustor. The stoichiometric exhaust gas recovery combustor may include a combustion liner, an extended flow sleeve in communication with the main compressor, and an extraction port in communication with the turbine. The extended flow sleeve receives the flow of ambient air from the main compressor so as to cool the combustion liner and then the flow of ambient air splits into an extraction flow to the turbine via the extraction port and a combustion flow within the combustion liner.

The present application further provides a method of operating a stoichiometric exhaust gas recovery turbine system. The method may include the steps of providing an extended flow sleeve about a firing zone of a combustor, flowing ambient air along the extended flow sleeve about the firing zone so as to cool the firing zone, extracting a portion of the ambient airflow downstream of the firing zone, and flowing the remaining portion of the ambient airflow within the firing zone for combustion therein.

The present application further provides a stoichiometric exhaust gas recovery combustor for combusting a flow of ambient air and a flow of fuel. The stoichiometric exhaust gas recovery combustor may include a mixing zone, a firing zone, an extend flow sleeve surrounding the mixing zone and the firing zone, and an extraction port positioned about the flow sleeve and downstream of the firing zone. The flow of ambient air flows through the extended flow sleeve to cool the firing zone and then splits into an extraction flow via the extraction port and a combustion flow into the mixing area.

These and other features and improvements of the present application will become apparent to one of ordinary skill in the art upon review of the following detailed description when taken in conjunction with the several drawings and the appended claims.

DETAILED DESCRIPTION

Figure 1:
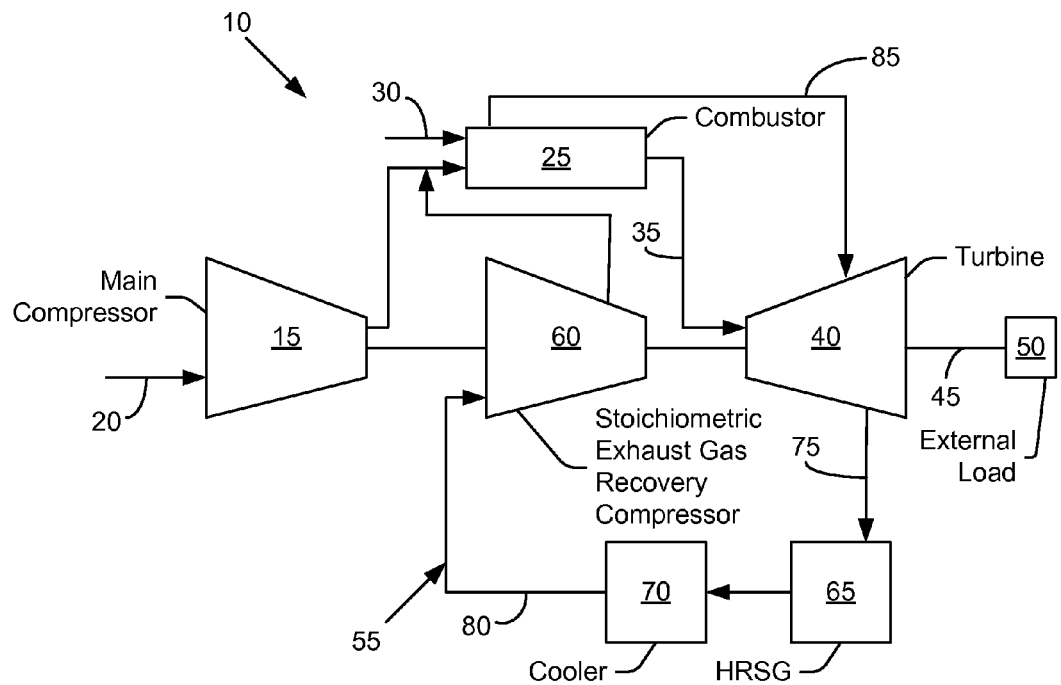
FIG. 1 is a schematic view of a stoichiometric exhaust gas recirculation turbine system.

Referring now to the drawings, in which like numerals refer to like elements throughout the several views, FIG. 1 shows an example of a stoichiometric exhaust gas recovery turbine system 10. The stoichiometric exhaust gas recovery turbine system 10 may include a main compressor 15. The main compressor 15 compresses an incoming flow of ambient air 20. The main compressor 15 delivers the compressed flow of ambient air 20 to a combustor 25. The combustor 25 mixes the compressed flow of ambient air with a compressed flow of fuel 30 and ignites the mixture to create a flow of combustion gases 35. Although only a single combustor 25 is shown, the stoichiometric exhaust gas recovery turbine system 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the main compressor 15 via a shaft 45 and an external load 50 such as an electrical generator and the like. Other components and other configurations may be used herein.

The stoichiometric exhaust gas recovery turbine system 10 also may include a stoichiometric exhaust gas recovery subsystem 55. The stoichiometric exhaust gas recovery subsystem 55 may include a stoichiometric exhaust gas recovery compressor 60. The stoichiometric exhaust gas recovery compressor 60 may be in communication with and driven by the shaft 45. The stoichiometric exhaust gas recovery subsystem 55 also may include a heat recovery steam generator 65 and a cooler 70 downstream of the turbine 40. Other components and other configurations may be used herein.

Due to the stoichiometric nature of the combustion herein, the flow of combustion gases 35 through the turbine 40 may contain only low levels of oxygen because of the equilibrium chemistry at the temperatures used for combustion. As such, the combustion gases 35 leaving the turbine 40 may be considered a low oxygen recirculation flow 75. The low oxygen recirculation flow 75 thus may be cooled in a recirculation loop 80 in the heat recovery steam generator 65 and the cooler 70 with the heat therein available for useful work. The now cooled low oxygen recirculation flow 75 then may be compressed within the stoichiometric exhaust gas recovery compressor 60 and mixed with the flow of ambient air 20 and the flow of fuel 30 in the combustor 25 for combustion therein. The stoichiometric exhaust gas recovery turbine system 10 and the components described herein are for the purposes of example only. The stoichiometric exhaust gas recovery turbine system 10 may have many other components and other configurations.

As described above, a portion of the ambient airflow 20 may be extracted at the combustor 25 and sent to the turbine 40 via a combustion extraction line 85. About thirty percent (30%) or more of the ambient airflow 20 may be diverted so as to ensure stoichiometric operation therein. The amount of the diversion may depend upon the flow needed to replace the oxidizer such as air or oxygen. Other types and amounts of air extractions may be used herein.

Figure 2:
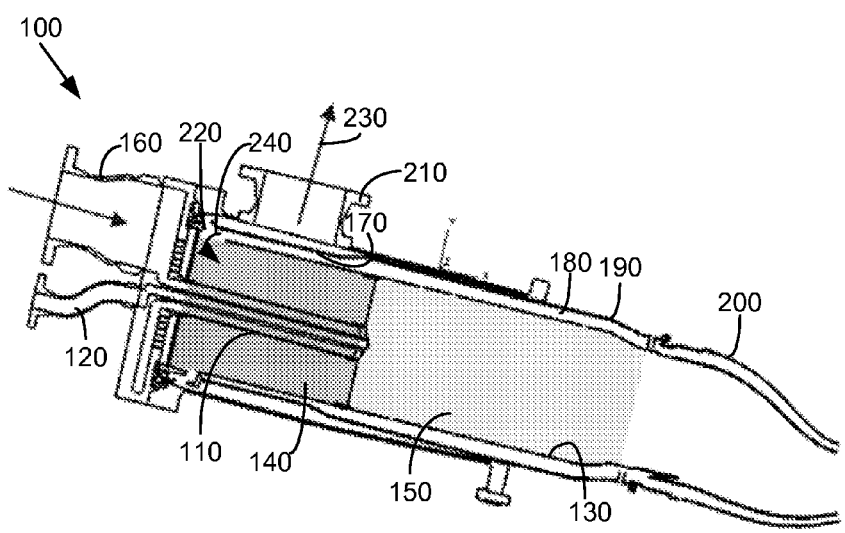
FIG. 2 is a side cross-sectional view of a stoichiometric exhaust gas recirculation combustor as may be described herein for use with a stoichiometric exhaust gas recirculation turbine system.

FIG. 2 shows a stoichiometric exhaust gas recovery combustor 100 as may be described herein. The stoichiometric exhaust gas recovery combustor 100 may be used with the stoichiometric exhaust gas recovery turbine system 10 described above and the like. The stoichiometric exhaust gas recovery combustor 100 may include one or more fuel nozzles 110 therein. The fuel nozzle 110 may be greater in length as compared to typical fuel nozzles for the reasons described below. The fuel nozzle 110 may be in communication with a fuel inlet 120. As described above, the stoichiometric exhaust gas recovery combustor 100 may mix the flow of ambient air 20, the flow of fuel 30, and the low oxygen recirculation flow 75 and then ignite the mixture to produce the flow of combustion gases 35.

The stoichiometric exhaust gas recovery combustor 100 also may include a combustion liner 130. The combustion liner 130 may define a mixing zone 140 and a firing zone 150 therein. The fuel nozzle 110 may be positioned within and extends through the mixing zone 140 into the firing zone 150. As with the fuel nozzle 110, the combustion liner 130, the mixing zone 140, and the firing zone 150 may be longer in length as compared to those typically found in a conventional combustor. A low oxygen recirculation inlet 160 also may be in communication with the mixing zone 140 for the low oxygen recirculation flow 75.

An extended flow sleeve 170 may surround the combustion liner 130 and may define an ambient air path 180 therein for the flow of ambient air 20. The extended flow sleeve 170 and the recirculated gas may be in communication with the main compressor 15. The flow of ambient air 20 in the ambient air path 180 of the extended flow sleeve 170 cools the combustion liner 130 about the firing zone 150 while providing the flow of ambient air 20 to the mixing zone 140. The extended flow sleeve 170 also may be longer in length as compared to those of conventional compressors to ensure adequate cooling of the combustion liner 130 about the firing zone 150. Increasing the length of the flow sleeve 170 thus requires the increased length of the other components described above. A casing 190 may surround the extended flow sleeve 170 and the combustion liner 130. A transition piece 200 may be positioned downstream of the firing zone 150.

An extraction port 210 may be positioned about the casing 190 and in communication with the ambient air path 180 of the extended flow sleeve 170. The extraction port 210 may be in communication with the turbine 40 via the extraction line 85. The extraction port 210 may be positioned downstream of the firing zone 150 such that all or most of the ambient airflow 20 passes about the firing zone 150 for cooling therewith. The extended flow sleeve 170 may end via one or more flow sleeve apertures 220. The one or more flow sleeve apertures 220 may be in communication with the mixing zone 140.

The extraction port 210 and the one or more flow sleeve apertures 220 thus split the ambient airflow 20 after cooling into an extraction flow 230 that passes through the extraction port 210 to the turbine 40 via the extraction line 85 and a combustion flow 240 that flows into the mixing zone 140 via the one or more flow sleeve apertures 220 for combustion therein. Other configurations and other components may be used herein.

In use, the volume of the extraction flow 230 may be determined by the size, number, and position of the flow sleeve apertures 220 in the extended flow sleeve 170 as compared to the extraction port 210. The desired percentage of the ambient airflow 20 thus may be extracted to the turbine 40 via the extraction port 230. Thirty percent (30%) or more of the ambient airflow 20 thus may be extracted. The remaining combustion flow 240 then mixes in the mixing zone 140 via the flow sleeve apertures 220 with the low oxygen recirculation flow 75 and ignited with the flow of fuel 30 within the firing zone 150. Because of the extended flow sleeve 170, the desired cooling flow within the ambient air path 180 is maintained about the combustion liner 130 near the firing zone 150.

The stoichiometric exhaust gas recovery combustor 100 thus meets increased air extraction requirements without diminishing the cooling flow along the combustion liner 130 about the firing zone 150. Likewise, the stoichiometric exhaust gas recovery combustor 100 meets component lifetime requirements despite the increased extraction.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A stoichiometric exhaust gas recovery turbine system, comprising:
   a main compressor for compressing a flow of ambient air:
   a turbine; and
   a stoichiometric exhaust gas recovery combustor, comprising:
      a fuel nozzle;
      a combustion liner comprising a mixing zone and a firing zone, wherein the mixing zone is disposed about the fuel nozzle and the firing zone is disposed downstream of the fuel nozzle relative to a flow within the combustion liner;
      an extended flow sleeve disposed about the combustion liner and in communication with the main compressor and the mixing zone;
      a casing disposed radially outward of the extended flow sleeve;
      an extraction port disposed through the casing and in communication with the extended flow sleeve and the turbine, wherein the extraction port is positioned axially aligned with the mixing zone and downstream of the firing zone relative to an ambient air path formed between the combustion liner and the extended flow sleeve, wherein the extended flow sleeve receives the flow of ambient air from the main compressor so as to cool the combustion liner about the firing zone and then the flow of ambient air spits into an extraction flow to the turbine via the extraction port and a combustion flow to the mixing zone within the combustion liner; and a low oxygen recirculation inlet in communication with the mixing zone, wherein the low oxygen recirculation inlet is configured to provide the mixing zone with a low oxygen recirculation flow from the turbine to mix with the combustion flow within the mixing zone.

2. The stoichiometric exhaust gas recovery turbine system of claim 1, wherein the low oxygen recirculation flow exits the turbine via a recirculation loop in communication with the stoichiometric exhaust gas recovery combustor.

3. The stoichiometric exhaust gas recovery turbine system of claim 2, wherein the recirculation loop comprises a heat recovery steam generator and/or a cooler therein.

4. The stoichiometric exhaust gas recovery turbine system of claim 2, wherein the recirculation loop comprises a stoichiometric exhaust gas recovery compressor therein.

5. The stoichiometric exhaust gas recovery turbine system of claim 1, wherein the extended flow sleeve comprises one or more flow sleeve apertures in communication with the mixing zone.

6. The stoichiometric exhaust gas recovery turbine system of claim 1, wherein the extraction flow comprises about thirty percent (30%) or more of the flow of ambient air.

7. A method of operating a stoichiometric exhaust gas recovery turbine system, comprising:

providing an extended flow sleeve about a firing zone of a combustor;

providing a combustion liner comprising mixing zone and the firing zone, wherein the mixing zone is disposed about a fuel nozzle and the firing zone is disposed downstream of the fuel nozzle relative to a flow within the combustion liner;

providing a casing radially outward of the extended flow sleeve;

flowing ambient air along the extended flow sleeve about the firing zone to cool the firing zone;

extracting a portion of the ambient airflow downstream of the firing zone by way of an extraction port disposed through the casing and in communication with the extended flow sleeve, wherein the extraction port is positioned axially aligned with the mixing zone and downstream of the firing zone relative to the ambient air path formed between the combustion liner and the extended flow sleeve, wherein the extended flow sleeve receives the flow of ambient air so as to cool the combustion liner about the firing zone and then the flow of ambient air splits into an extraction flow via the extraction port and a remaining portion flowing to the mixing zone within the combustion liner;

flowing the remaining portion of the ambient portion of the ambient airflow into the firing zone for combustion therein; and providing a low oxygen recirculation flow to the combustor by way of a low oxygen recirculation inlet in communication with the mixing zone, wherein the low oxygen recirculation inlet is configured to provide the mixing zone with a low oxygen recirculation flow from the turbine to mix with the remaining portion of the ambient airflow within the mixing zone.

8. The method of claim 7, wherein the step of extracting a portion of the ambient air flow comprises extracting about thirty percent (30%) or more of the ambient air flow.

9. The method of claim 7, further comprising the step of forwarding the extracted portion of the ambient airflow to a turbine.

10. The method of claim 7, further comprising the step of driving a main compressor and a stoichiometric exhaust gas recovery compressor by a turbine.

11. A stoichiometric exhaust gas recovery combustor for combusting a flow of ambient air and a flow of fuel, comprising:

a fuel nozzle;

a combustion liner comprising a mixing zone and a firing zone, wherein the mixing zone is disposed about the fuel nozzle and the firing zone is disposed downstream of the fuel nozzle relative to a flow within the combustion liner;

an extended flow sleeve disposed about the combustion liner and in communication with the main compressor and the mixing zone;

a casing disposed radially outward of the extended flow sleeve;

an extraction port disposed through the casing and in communication with the extended flow sleeve and the turbine, wherein the extraction port is positioned axially aligned with the mixing zone and downstream of the firing zone relative to an ambient air path formed between the combustion liner and the extended flow sleeve, wherein the extended flow sleeve receives the flow of ambient air from the main compressor so as to cool the combustion liner about the firing zone and then the flow of ambient air spits into an extraction flow to the turbine via the extraction port and a combustion flow to the mixing zone within the combustion liner; and a low oxygen recirculation inlet in communication with the mixing zone, wherein the low oxygen recirculation inlet is configured to provide the mixing zone with a low oxygen recirculation flow from the turbine to mix with the combustion flow within the mixing zone.

12. The stoichiometric exhaust gas recovery combustor of claim 11, wherein the extended flow sleeve comprises one or more flow sleeve apertures in communication with the mixing zone.

13. The stoichiometric exhaust gas recovery combustor of claim 11, wherein the fuel nozzle extends through the mixing zone.

14. The stoichiometric exhaust gas recovery combustor of claim 11, wherein the extraction flow comprises about thirty percent (30%) or more of the flow of ambient airflow.

* * * * *

UNITED STATES PATENT AND TRADEMARK OFFICE
CERTIFICATE OF CORRECTION

PATENT NO.      : 8,910,485 B2                                      Page 1 of 1
APPLICATION NO. : 13/087463
DATED           : December 16, 2014
INVENTOR(S)     : Kraemer et al.

It is certified that error appears in the above-identified patent and that said Letters Patent is hereby corrected as shown below:

In the Claims
In Column 5, Line 33, in Claim 7, delete "comprising" and insert -- comprising a --, therefor.

Signed and Sealed this
Twelfth Day of May, 2015

Michelle K. Lee
*Director of the United States Patent and Trademark Office*